(12) United States Patent
Nam et al.

(10) Patent No.: US 10,944,139 B2
(45) Date of Patent: Mar. 9, 2021

(54) AIR COOLING BATTERY MODULE HAVING GUIDE VANE

(71) Applicant: LG Chem, Ltd., Seoul (KR)

(72) Inventors: Jin-Moo Nam, Daejeon (KR); Jin-Kyu Shin, Daejeon (KR); Jung-Il Park, Daejeon (KR); Jong-Kyu Ahn, Daejeon (KR); Gyung-Soo Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 130 days.

(21) Appl. No.: 15/901,321

(22) Filed: Feb. 21, 2018

(65) Prior Publication Data

US 2018/0248239 A1 Aug. 30, 2018

(30) Foreign Application Priority Data

Feb. 24, 2017 (KR) ........................ 10-2017-0024650

(51) Int. Cl.
*H01M 10/00* (2006.01)
*H01M 10/6566* (2014.01)
*H01M 10/613* (2014.01)
*H01M 10/6557* (2014.01)
(Continued)

(52) U.S. Cl.
CPC ..... *H01M 10/6566* (2015.04); *H01M 10/613* (2015.04); *H01M 10/625* (2015.04); *H01M 10/6557* (2015.04); *H01M 10/6563* (2015.04); *H01M 2220/20* (2013.01)

(58) Field of Classification Search
None
See application file for complete search history.

(56) References Cited

U.S. PATENT DOCUMENTS 7,642,006 B2   1/2010 Lee et al.
2006/0115721 A1* 6/2006 Lee .................. H01M 10/4207
                                                        429/156
(Continued)

FOREIGN PATENT DOCUMENTS

EP    1 202 359 B1    1/2009
JP    6064179 B2 *    1/2017 ........... F04D 29/281
(Continued)

OTHER PUBLICATIONS

Office Action dated Jan. 15, 2020, issued in corresponding Korean Patent Application No. 10-2017-0024650.

*Primary Examiner* — Milton I Cano
*Assistant Examiner* — Mary G Henshaw
(74) *Attorney, Agent, or Firm* — Morgan, Lewis & Bockius LLP

(57) ABSTRACT

Disclosed is battery module, which includes a cell assembly having battery cells arranged side by side in one direction and air channels formed at the intervals of the battery cells, and an inlet duct mounted to a front surface of the cell assembly at which the air channels are located to distribute a cooling air to the air channels. The inlet duct includes an air inlet disposed to face air channels, which are located in a central region in the arrangement of the air channels, at a location spaced apart therefrom, a cooling fan being installed at the air inlet to introduce the cooling air; and a guide vane composed of a plurality of plate barriers respectively extending obliquely toward the air channels based on the air inlet at a predetermined acute angle to distribute the flow of air.

10 Claims, 10 Drawing Sheets

(51) Int. Cl.
  *H01M 10/625* (2014.01)
  *H01M 10/6563* (2014.01)

(56) References Cited

U.S. PATENT DOCUMENTS

| | | | | |
|---|---|---|---|---|
| 2007/0026301 | A1* | 2/2007 | Lee | H01M 2/1077 429/120 |
| 2007/0144804 | A1* | 6/2007 | Pike | H01M 2/1072 180/170 |
| 2008/0299448 | A1* | 12/2008 | Buck | H01M 10/6553 429/120 |
| 2010/0075206 | A1* | 3/2010 | Tamura | H01M 2/1077 429/62 |
| 2015/0064540 | A1* | 3/2015 | Roh | H01M 10/6554 429/153 |
| 2016/0226116 | A1* | 8/2016 | Noh | H01M 10/6557 |
| 2017/0096079 | A1* | 4/2017 | Yokote | F04D 29/444 |
| 2017/0187083 | A1* | 6/2017 | Mueller | H01M 2/1077 |
| 2018/0083326 | A1* | 3/2018 | Yokote | F04D 27/002 |
| 2018/0159188 | A1* | 6/2018 | Yokote | B60K 11/08 |
| 2018/0331402 | A1* | 11/2018 | Inoue | H01M 10/613 |

FOREIGN PATENT DOCUMENTS

| | | |
|---|---|---|
| KR | 10-2012-0055156 A | 5/2012 |
| KR | 10-2016-0024688 A | 3/2016 |

* cited by examiner

AIR COOLING BATTERY MODULE HAVING GUIDE VANE

TECHNICAL FIELD

The present application claims priority to Korean Patent Application No. 10-2017-0024650 filed on Feb. 24, 2017 in the Republic of Korea, the disclosures of which are incorporated herein by reference.

The present disclosure relates to a battery module, and more particularly, to a cooling technology of a battery module.

BACKGROUND ART

Unlike a primary battery that is not rechargeable, a secondary battery refers to a battery capable of charging and discharging, and the secondary battery is used as a power source not only for small advanced electronic devices such as a mobile phone, a PDA and a notebook computer but also for an energy storage system (ESS), an electric vehicle (EV) and a hybrid electric vehicle (HEV).

A device requiring a large power such as an electric vehicle driven by a motor general uses a large capacity battery module configured by stacking a plurality of high output cells connected in series. For example, in a battery module for an HEV, several to dozens of cells are alternately charged and discharged, and thus it is necessary to control the charging/discharging so that the battery module is maintained in an appropriate operating state.

In particular, since the heat generated while the secondary battery is in operation increases the temperature of the secondary battery, if the heat is not efficiently cooled, the life span of the secondary battery is shortened and malfunctions are caused to seriously deteriorate the stability. Thus, cooling the secondary battery is an important issue in producing a battery module including a secondary battery.

In the battery module, adjacent cells are stacked at regular intervals so that the heat generated during charging and discharging is removed. For example, the cells may be stacked while spaced apart from each other by a predetermined distance without any member. If the cells have a low mechanical rigidity, one cell or a combination of two or more cells are included in a cartridge, and then a plurality of such cartridges may be stacked to configure a battery module. The stacked cells are structured to have a channel of a coolant such as cooling water or cooling air so as to effectively remove accumulated heat. For example, in a direct air-cooling module, an air channel through which cooling air may flow is provided between cells. Generally, a cooling fan is used to provide cooling air.

Meanwhile, the conventional direct air-cooling module is typically classified into a U-type module as shown in FIG. 1 and a Z-type module having a basic structure similar to the U-type module but having an air outlet provided at a side opposite to the air outlet 20 of the U-type module, though not shown in the figure (see Korean Unexamined Patent Publication No. 10-2016-0024688). In the U-type or Z-type modules, the air flow is reduced as the air channel 50 is located farther away from an air inlet 10 of an inlet duct. Thus, to solve this problem, an inclination of the inlet duct may be adjusted.

However, in the U-type module or the Z-type module, inlets of the air channels 50 between the cells 40 intersects with the air flow in the inlet duct, and thus the air flow introduced from the inlet duct into the air channel may not be smooth. Further, when a structure such as the cartridge 30 is used, a protruding portion of the cartridge 30 interferes with the air flow, so there is a limit in reducing the temperature deviation among the unit cells and improving the cooling efficiency.

RELATED LITERATURES

Patent Literature

Korean Unexamined Patent Publication No. 10-2016-0024688 (Mar. 7, 2016), LG CHEM

DISCLOSURE

Technical Problem

The present disclosure is directed to providing an air cooling battery module which ensures uniform air flow and flow distribution for air channels arranged in parallel.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, which includes a cell assembly having battery cells arranged side by side in one direction and air channels formed at the intervals of the battery cells, and an inlet duct mounted to a front surface of the cell assembly at which the air channels are located to distribute a cooling air to the air channels, wherein the inlet duct includes an air inlet disposed to face air channels, which are located in a central region in the arrangement of the air channels, at a location spaced apart therefrom, a cooling fan being installed at the air inlet to introduce the cooling air; and a guide vane composed of a plurality of plate barriers respectively extending obliquely at a predetermined acute angle toward the air channels based on the air inlet to distribute the flow of air.

The guide vane may be segmented behind the air inlet to have four plate barriers that are symmetrical in lateral and vertical directions, and a gap is present among the four plate barriers so that the cooling air passes therethrough.

Each of the four plate barriers may include a main plate barrier located within a region to which the cooling air is perpendicularly introduced through the air inlet; and a sub plate barrier configured to extend outwards from the main plate barrier and having a smaller width in comparison to the main plate barrier.

A tail portion bent toward an inlet of the air channel may be formed at a terminal of the sub plate barrier.

The plate barriers may be formed to have a width that gradually decreases from the air inlet so that the gap is gradually expanded.

The guide vane may be segmented behind the air inlet to have two plate barriers that are symmetrical in a lateral direction, and a gap is present between the two plate barriers so that the cooling air passes therethrough.

The battery module may further comprise an outlet duct having an air outlet and mounted to a rear surface of the cell assembly at which outlets of the air channels are located, wherein the air inlet, the inlets and outlets of the air channels, and the air outlet are disposed side by side in order so that the cooling air is guided to flow in one direction.

The inlet duct may include a duct housing provided to be mountable to the front surface of the cell assembly, and the duct housing has an inner cover surface forming an inclined surface from the air inlet to an edge of the cell assembly.

The cell assembly may further include a plurality of cartridges that form the air channel, support at least one of the battery cells and be configured to be assembled to each other.

Electrode leads of the battery cells may be electrically connected by a plurality of bus bars and located at the front surface of the cell assembly.

The battery module may further comprise a plurality of insulation plates made of an insulating material and located between two adjacent bus bars to prevent the bus bars from being electrically shorted.

In another aspect of the present disclosure, there is also provided an energy storage system that comprises the battery module described above.

Advantageous Effects

According to one embodiment of the present disclosure, the air cooling battery module ensures high uniformity of flow distribution to air channels since the flow of cooling is effectively distributed behind and air inlet by means of a guide vane. In addition, since inlets of the air channels are arranged side by side with the air inlet of the inlet duct, the cooling air may enter the air channels quickly and smoothly. Thus, the air cooling battery module according to the present disclosure has excellent cooling performance and the temperature deviation among battery cells is small.

BEST MODE

Figure 1:
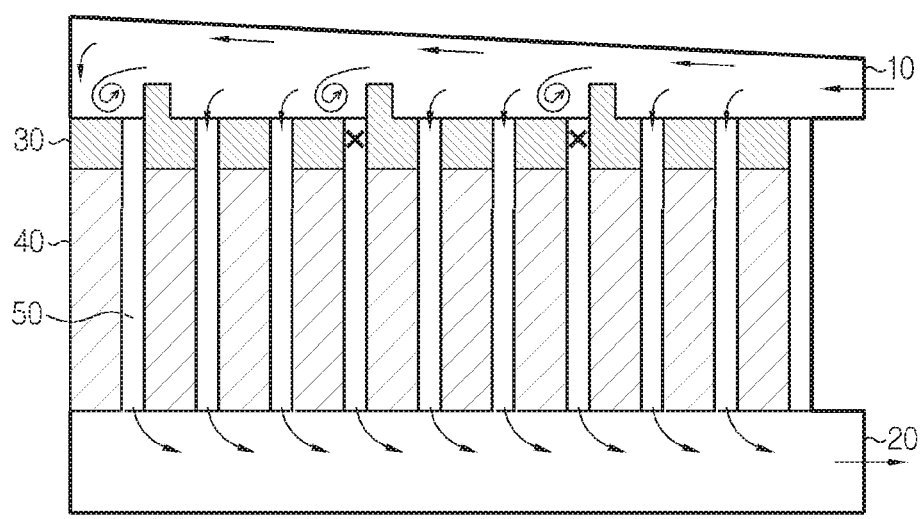
FIG. 1 is a schematic cross-sectioned view showing a conventional air cooling battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiments disclosed herein are provided for more perfect explanation of the present disclosure, the shape, size and the like of components may be exaggerated, omitted or simplified in the drawings for better understanding. Thus, the size and ratio of components in the drawings do not wholly reflect the actual size and ratio.

Figure 2:
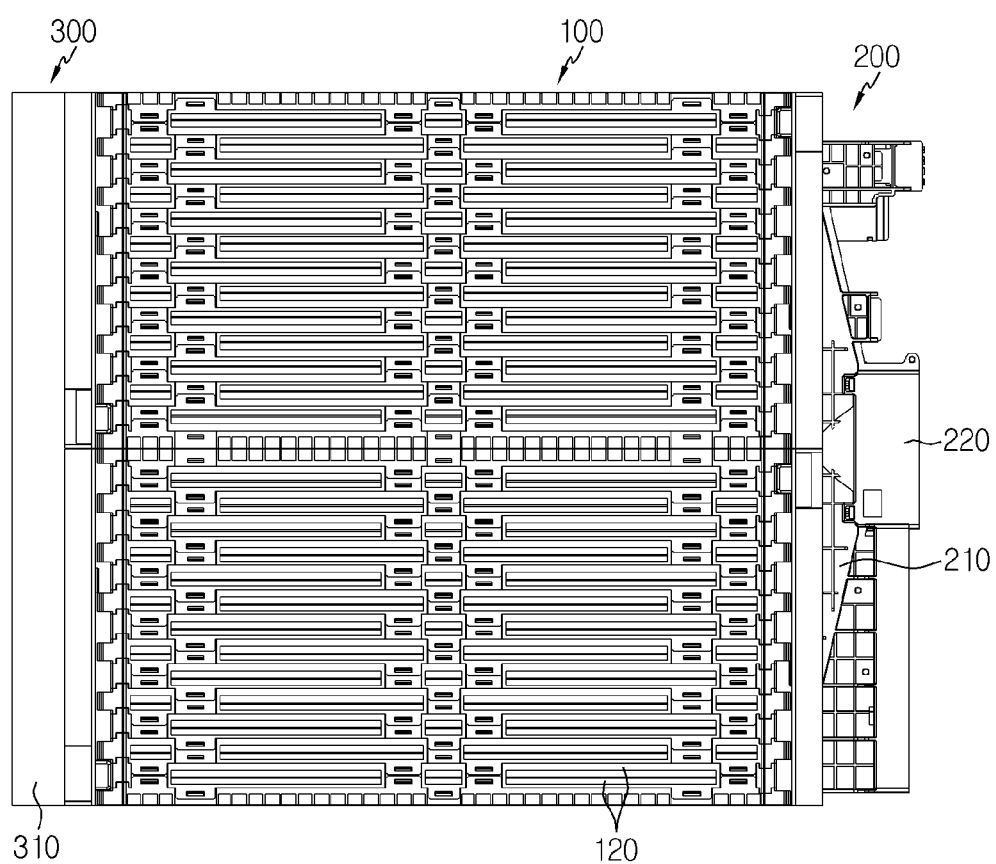
FIG. 2 is a top view showing an air cooling battery module according to an embodiment of the present disclosure.
Figure 3:
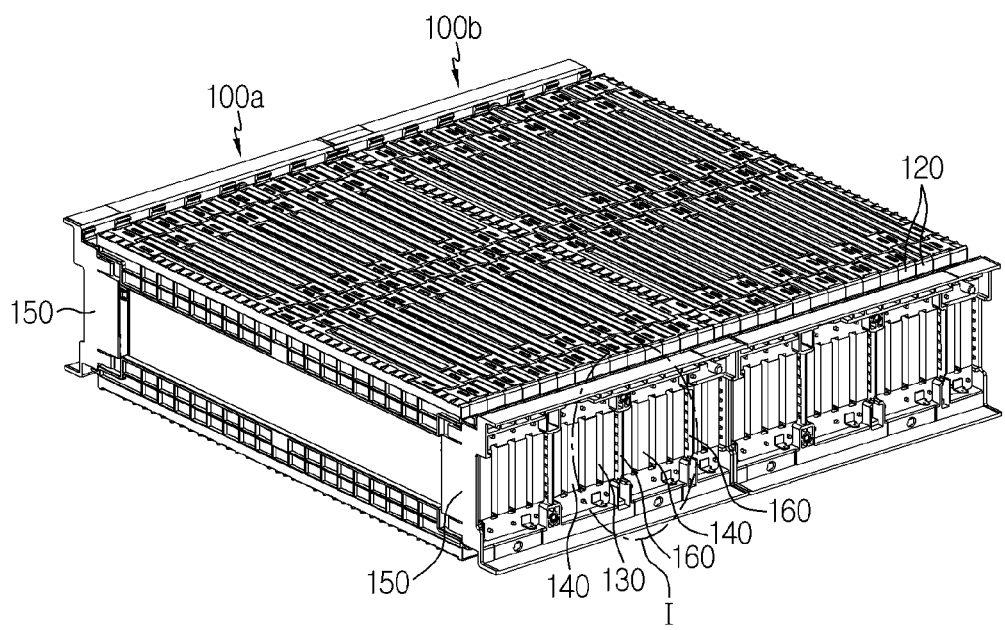
FIG. 3 is a perspective view showing a cell assembly of FIG. 2.
Figure 4:
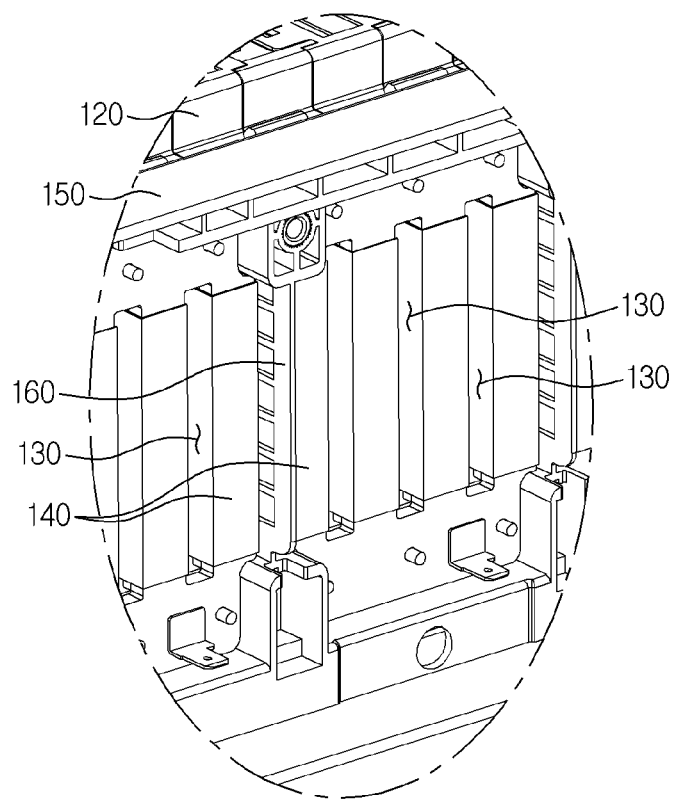
FIG. 4 is an enlarged view showing a portion I of FIG. 3.

FIG. 2 is a top view showing an air cooling battery module according to an embodiment of the present disclosure, FIG. 3 is a perspective view showing a cell assembly of FIG. 2, and FIG. 4 is an enlarged view showing a portion I of FIG. 3.

Referring to FIGS. 2 to 4, an air cooling battery module according to an embodiment of the present disclosure includes a cell assembly 100, an inlet duct 200 and an outlet duct 300.

As will be described in detail below, the air cooling battery module according to the present disclosure may be regarded as an I-type module in which an air inlet 220, an air channel 130 and an air outlet 310 are arranged side by side in order so that a cooling air is guided to flow in one direction as a whole. In the I-Type module, the cooling air flows in with a smaller incident angle in comparison to a U-type or Z-type module, so the cooling air may smoothly enter the air channel 130 and flow fast to improve the cooling efficiency.

A cell assembly 100 employed at the air cooling battery module of the present disclosure will be described first. The cell assembly 100 includes a plurality of battery cells 110 arranged side by side in one direction and air channels 130 provided at the intervals of the battery cells 110.

The battery cell 110 may be a lithium ion battery, a lithium polymer battery, a nickel cadmium battery, a nickel hydrogen battery, a nickel zinc battery, or the like, which allow charging and discharging. The battery cells 110 may be connected in series and/or in parallel depending on the required output voltage or charge/discharge capacity.

In addition, the cell assembly 100 may further include a plurality of cartridges 120 for supporting the battery cells 110, a plurality of bus bars 140 for electrically connecting the battery cells 110 to each other, and a support frame 150 for supporting the stack of the cartridges 120 and the bus bars 140.

The cartridges 120 are used for stacking the battery cells 110. The cartridges 120 hold the battery cells 110 to prevent the battery cells 110 from moving and are configured to be assembled with each other in a snap-fit manner to guide assembling of the battery cells 110. For example, though not shown in the figures for the sake of convenience of illustration, the cartridge 120 may include a rectangular ring-shaped frame and a pair of cooling plates that cover upper and lower ends of the frame. One battery cell 110 may be placed on each of top and bottom portions of the pair of cooling plates. Here, the air channel 130 may be provided between the pair of cooling plates.

In addition the rectangular frame may have a cut portion formed by perforating the frame in a horizontal direction. The cut portion may be provided at two opposite sides of the rectangular frame. A cooling fluid such as air may enter the air channel 130 through the cut portion at one side of the frame and exit through the cut portion at the other side of the frame. Thus, the pair of cooling plates may cool the battery cell 110 by maintaining low temperature in contact with the cooling air. Such unit cartridges 120 may be coupled in one direction in a snap-fit manner to form a stack of the cartridges 120.

Meanwhile, electrode leads of the battery cells 110, namely a positive electrode lead and a negative electrode lead, may extend outward from the inside of the cartridges 120. Terminals of electrode leads of neighboring battery cells 110 may be welded to one bus bar 140 to be electrically connected with each other. The plurality of bus bars 140 may be assembled at one board, and the board may be mounted on a front or rear surface of the stack of the cartridges 120. The electrode leads of the battery cells 110 may be welded to the bus bars 140 so that the battery cells 110 may be connected in series and/or in parallel.

The support frame 150 is a structure that integrally fixes the plurality of cartridges 120 at the front and rear surfaces of the stack of the cartridges 120. The support frame 150 may include a plurality of insulation plates 160, which are made of an insulating material to prevent a short circuit between the bus bars 140. The insulation plates 160 are configured to protrude more than the bus bars 140 to form a barrier between two bus bars 140 adjacent to each other.

The cell assembly 100 may also be configured by connecting at least two unit cell assemblies 100 in a lateral direction. For example, as shown in FIG. 3, two unit cell assemblies 100 may be connected to configure a high capacity cell assembly 100 having about 28 battery cells 110. According to this configuration, the capacity of the battery module may be easily increased by adding a unit cell assembly 100 to the existing cell assembly 100.

Referring to FIGS. 2 to 4 again, the battery module according to the present disclosure is configured such that inlets and outlets of the air channels 130 as well as the electrode leads and the bus bars 140 are respectively located at the front and rear portions of the cell assembly 100. The inlet duct 200 and the outlet duct 300 are mounted to cover the front and rear portions of the cell assembly 100, respectively.

The cooling air blown into the front surface of the cell assembly 100 through the inlet duct 200 flows through the air channels 130 to the rear surface of the cell assembly 100 and then is discharged out through the outlet duct 300. Thus, the connection region between the electrode lead and the bus bar 140 at which heat is seriously generated during the charging and discharging process is exposed to the flow of the cooling air, and thus it is possible to more effectively suppress heating at the connection region.

Hereinafter, the inlet duct 200 will be described in more detail with reference to FIGS. 5 to 7.

Figure 5:
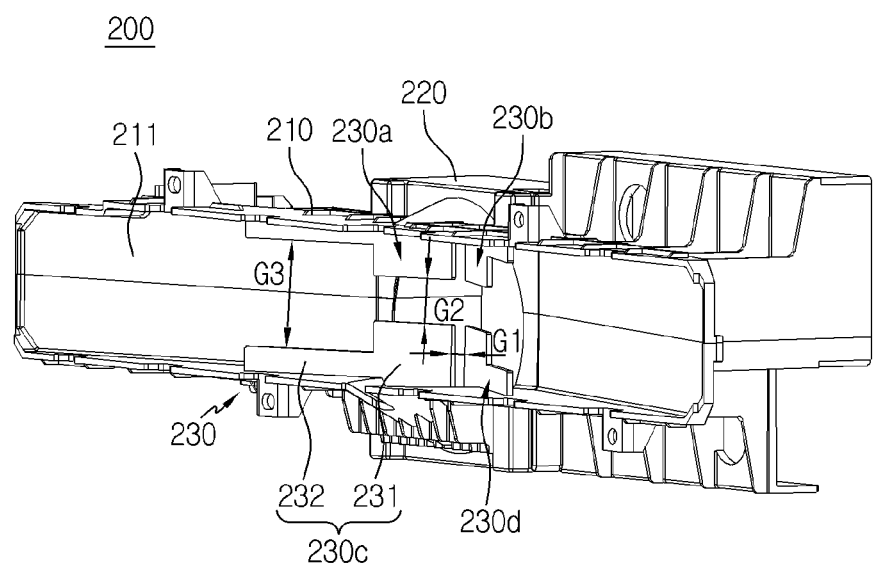
FIG. 5 is a perspective view showing an inlet duct of FIG. 2.
Figure 6:
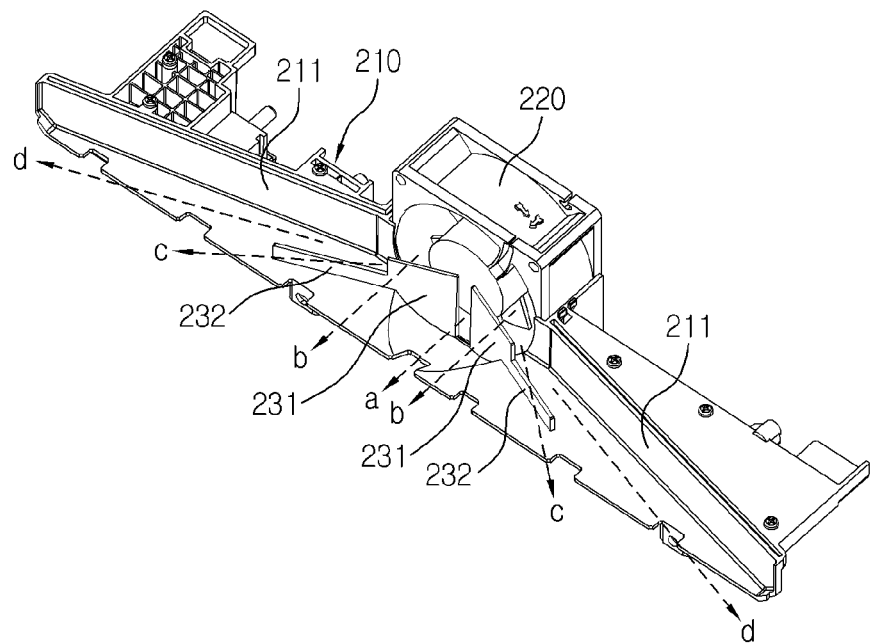
FIG. 6 is a perspective view showing the inlet duct of FIG. 5 from which a housing is partially removed.
Figure 7:
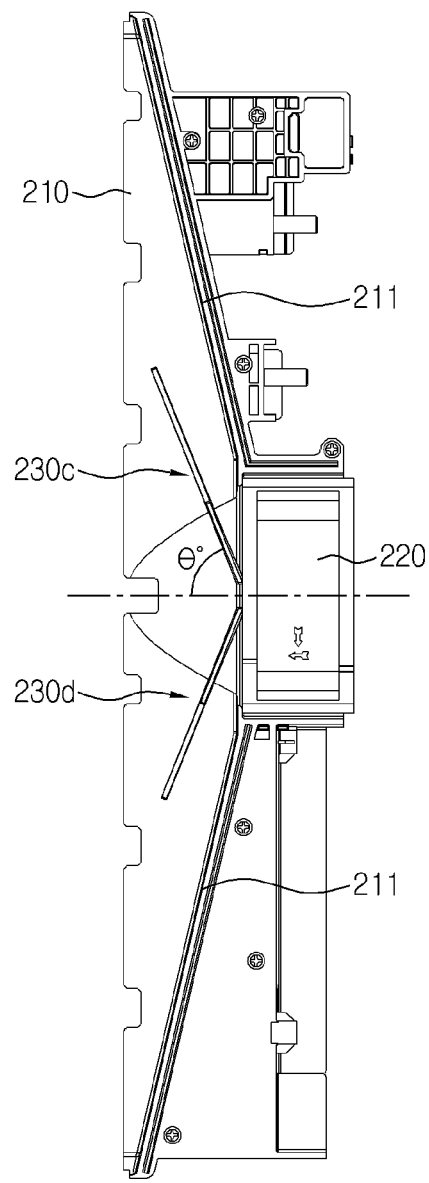
FIG. 7 is a top view of FIG. 6.

FIG. 5 is a perspective view showing the inlet duct 200 of FIG. 2, FIG. 6 is a perspective view showing the inlet duct 200 of FIG. 5 from which a housing 210 is partially removed, and FIG. 7 is a top view of FIG. 6.

Since the cooling air flows in an I-type pattern in the battery module according to the present disclosure, the air inlet 220 is located at the center of the arrangement of the air channels 130 and the distance between the air channels 130 and the air inlet 220 is relatively short. Thus, the cooling air may not be easily distributed to the air channels 130 arranged in parallel. For this, the battery module according to the present disclosure additionally includes a guide vane 230 provided in the inlet duct 200 for the uniform flow rate distribution of the cooling air at the inlets of the air channels 130.

In other words, the inlet duct 200 includes a duct housing 210 provided to cover the front portion of the cell assembly 100, an air inlet 220 for introducing a cooling air, and a guide vane 230 provided behind the air inlet 220 at the inside of the duct housing 210.

The duct housing 210 is provided to integrally cover the front portion of the cell assembly 100, namely the air channels 130. In particular, the duct housing 210 has an inner cover surface 211 that forms an inclined surface. The inner cover surface 211 extends to both edge portions of the cell assembly 100 from the air inlet 220. The inner cover surface 211 guides the flow of cooling air so that the cooling air blown from the air inlet 220 may be diffused toward both sides of the duct housing 210.

The air inlet 220 is provided at the center of the duct housing 210. Thus, when the inlet duct 200 is mounted to the cell assembly 100, the air inlet 220 is placed to face air channels 130 in the middle region of the arrangement of the air channels 130 with a predetermined interval. In addition, a cooling fan 221 is provided at the air inlet 220 to provide a cooling air. For example, the cooling fan 221 may be controlled to turn on/off by a cooling controller based on temperature information of the battery cells 110.

The guide vane 230 (see FIG. 7) may be composed of a plurality of plate barriers extending obliquely at a predetermined acute angle (θ) toward the air channels 130 based on the air inlet 220. The predetermined acute angle (θ) may be determined depending on a total length of the plurality of air channels 130 arranged in parallel with respect to the air inlet 220 or a lateral width of the cell assembly 100. The guide vane 230 serves to diffuse the cooling air at the center of the air inlet 220 in a lateral direction so that the flow rate of the cooling air may be uniformly distributed to the air channels 130.

More specifically, the guide vane 230 of this embodiment is segmented behind the air inlet 220 to have four plate barriers 230a, 230b, 230c, 230d that are symmetrical in lateral and vertical directions. In other words, the four plate barriers 230a, 230b, 230c, 230d of the guide vane 230 have substantially the same shape, and any one plate barrier is symmetrical to another other plate barrier in a vertical or lateral direction. Gaps of a predetermined interval are formed among the four plate barriers 230a, 230b, 230c, 230d so that the cooling air may pass through the gaps.

Each of the plate borders 230a, 230b, 230c, 230d may be configured as a main plate barrier 231 and a sub plate barrier 232. However, it should be understood that the main plate barrier 231 and the sub plate barrier 232 are conceptually separated elements, and the main plate barrier 231 and the sub plate barrier 232 may be integrally formed.

The main plate barrier 231 is located in a region where the cooling air is substantially vertically introduced through the air inlet 220, and the sub plate barrier 232 has a width smaller than the main plate barrier 231 and extends outward from the main plate barrier 231 beyond the air inlet 220. According to this configuration, as shown in FIG. 5, the gap between the first plate barrier 230a and the third plate barrier 230c is enlarged from G2 to G3 at the boundary between the main plate barrier 231 and the sub plate barrier 232. Since the guide vane 230 is symmetrical in a lateral direction, the gap between the second plate barrier and the fourth plate barrier also has the same configuration as above.

Thus, as in FIG. 6, the cooling air may flow in the directions a and b through the gaps G1, G2 between the main plate barriers 231 from the air inlet 220. In addition, the air flow guided along the inclined surface of the main plate barrier 231 may partially flow in the direction c at the point where the gap expands from G2 to G3, and the remaining air flow may flow along the gap G3 and the inclined surface of the sub plate barrier 232 in the direction d, namely farther in the lateral direction.

As described above, the main plate barrier 231 and the sub plate barrier 232 may serve to prevent the flow rate from concentrating in the air channel 130 in the middle region of the air channels 130 and also to distribute the air flow in the lateral direction.

Figure 8:
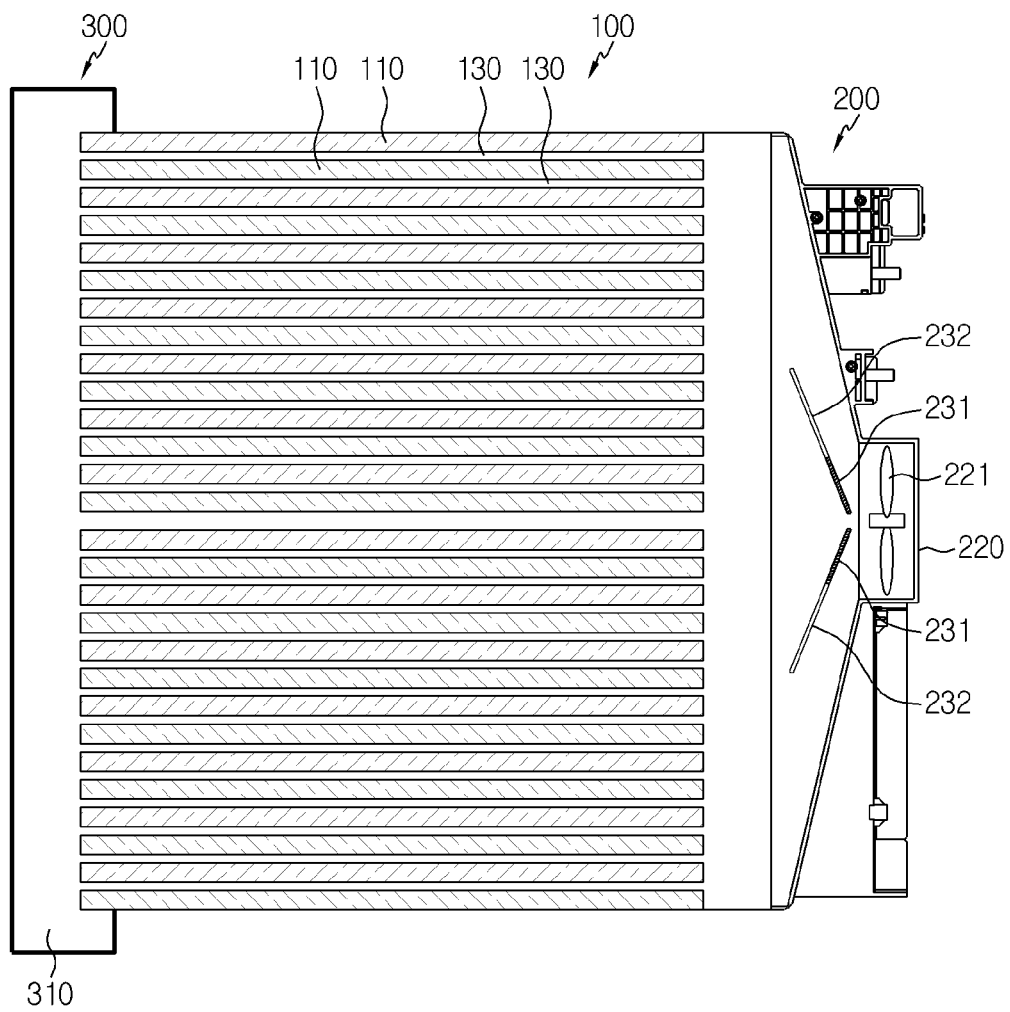
FIG. 8 is a schematic cross-sectioned view showing an air cooling battery module according to an embodiment of the present disclosure.
Figure 9:
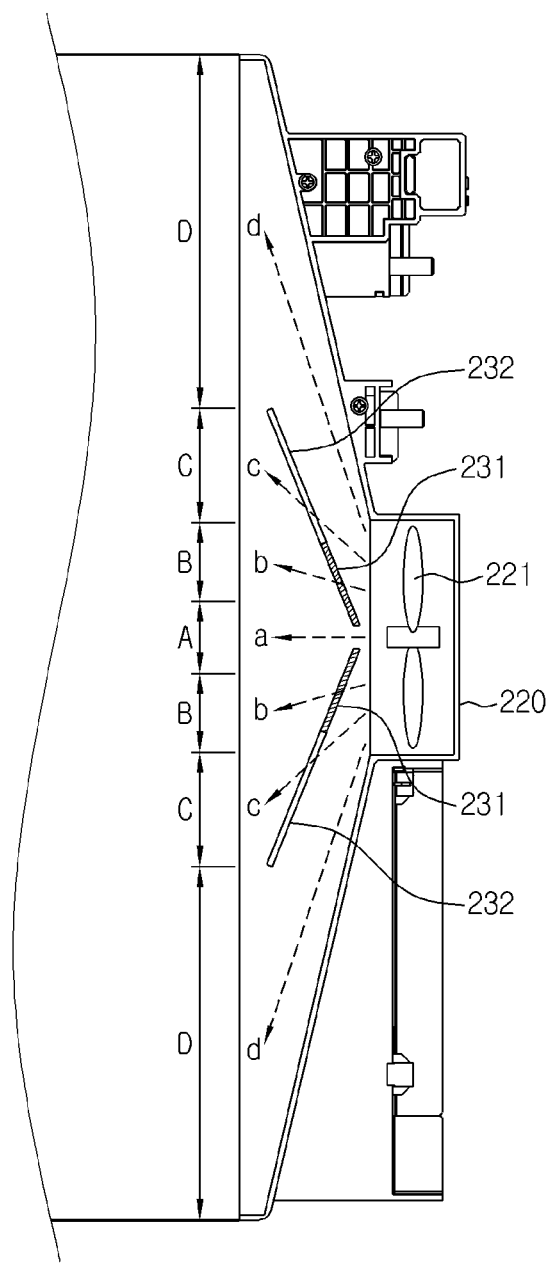
FIG. 9 is a partially enlarged view of FIG. 8 for illustrating an air flow by a guide vane.

FIG. 8 is a schematic cross-sectioned view showing an air cooling battery module according to an embodiment of the present disclosure, and FIG. 9 is a partially enlarged view of FIG. 8 for illustrating an air flow by a guide vane.

Hereinafter, the air flow and the flow distribution between the inlet duct 200 and the air channels 130 will be described in more detail with reference to FIGS. 5 to 7 along with the above figures.

Hereinafter, the air channels 130 are classified into several regions according to their positions based on the air inlet 220. For example, as shown in FIGS. 8 and 9, the air channels 130 located in the middle of the arrangement of the air channels 130 and facing the air inlet 220 are defined as being positioned in a first region A, the air channels 130 located at the right and left sides of the first region A and belonging to a range facing the air inlet 220 are defined as being positioned in a second region B, the air channels 130 belonging to a range corresponding to the sub plate barrier 232 from the second region B are defined as being positioned in a third region C, and the air channel 130 located in a range from the third region C to an outermost air channel 130 are defined as being positioned in a fourth region D.

The large flow of the cooling air, which may be guided by the guide vane 230 at the rear of the air inlet 220, may be briefly regarded as four air flows a, b, c, d as described above (see FIG. 6). The four cooling air flows (see FIG. 9) may be directed to the air channels 130 in the first region A to the fourth region D, respectively. That is, the flows a, b of the cooling air may be directly introduced into the air channels 130 in the first region A and the second region B through the gaps G1, G2 between the main plate barriers 231. Even though the flows a, b of the cooling air pass through the narrow gaps G1, G2, the flow velocity is fast at the center of the air inlet 220, so the flow rate is relatively not small compared to other parts.

Next, the flow c of the cooling air may be guided by the inclined surface of the main plate barrier 231 and introduced into the air channels 130 in the third region C through the gap G3. The flow c of the cooling air is slightly aside at the air inlet 220 in a lateral direction and thus has a relatively lower flow velocity, compared to the central portion, but since the gap through which the flow c passes is enlarged to G3, the flow rate reaching the third region C may be compensated as much.

Next, the flow d of the cooling air may be guided by the inclined surfaces of the main plate barrier 231 and the sub plate barrier 232 and be introduced into the air channels 130 in the fourth region D through the gap G3. The flow d of the cooling air may have a lowest flow velocity since it is aside farthest from the air inlet 220, but the flow rate of the cooling air that may be guided by the plate barriers is greatest.

As a result, the flows a, b, c, d of the cooling air by the guide vane 230 are introduced into the air channels 130 in the first region A to the fourth region D while compensating their air flow and velocity for each other, and thus the flow rate distributed to the air channels 130 may be almost uniform.

As described above, the air cooling battery module according to the present disclosure is an I-type module, and the cooling air enters smoothly at the inlets of the air channels 130 arranged in parallel, compared to a U-type or Z-type module. In particular, in the guide vane 230 according to the present disclosure, even though the air inlet 220 is located at the center and the distance to the air channels is short, it is possible to provide the cooling air to all air channels 130 in a uniform flow rate.

Next, referring to FIGS. 10 to 12, modified examples of the guide vane 230 of this embodiment will be described. The modified examples of the present disclosure described below may be regarded as corresponding to FIG. 4, when being compared to the above modified examples. The same reference numerals denote the same components, and the same components will not be described in detail, but different features from the guide vane 230 described above will be described in detail.

Figure 10:
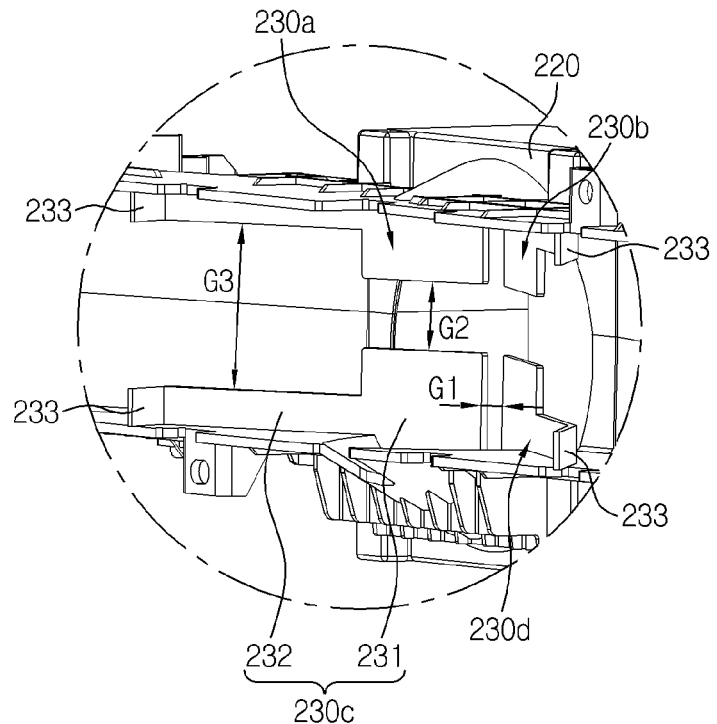
FIG. 10 is a diagram showing a modified example of the guide vane of FIG. 4.
Figure 11:
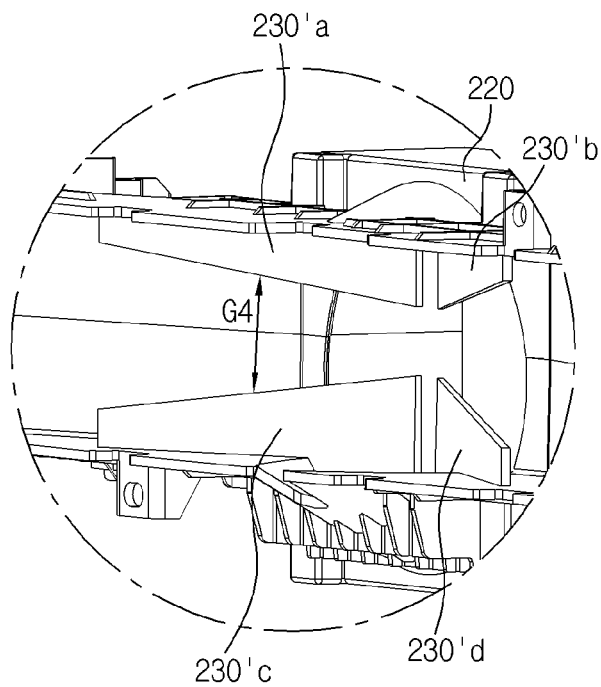
FIG. 11 is a diagram showing another modified example of the guide vane of FIG. 4.
Figure 12:
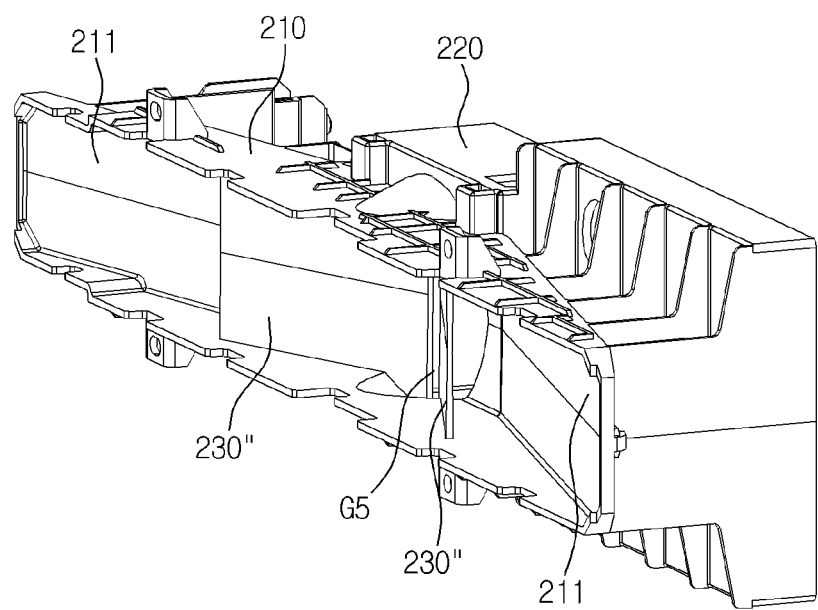
FIG. 12 is a diagram showing a still another modified example of the guide vane of FIG. 4.

FIG. 10 is a diagram showing a modified example of the guide vane 230 of FIG. 4, FIG. 11 is a diagram showing another modified example of the guide vane 230 of FIG. 4, and FIG. 12 is a diagram showing a still another modified example of the guide vane 230 of FIG. 4.

First, referring to FIG. 10, the guide vane 230 of this modified example further includes a tail portion 233 formed by bending a terminal of the sub plate barrier 232 toward the inlets of the air channels 130. Compared to the first region A to the third region C, the air channels 130 in the fourth region D are in a broader range. The tail portion 233 of the sub plate barrier 232 may further divide the air flow d more minutely so that the air flow may be distributed more uniformity for the air channels 130 in the fourth region D. Though not shown, a tail portion similar to the tail portion 233 of the sub plate barrier 232 may also be formed at a terminal of the main plate barrier 231 in a similar manner to divide the flow of the cooling air more minutely.

Referring to FIG. 11, in the guide vane 230 of this modified example, the plate barriers 230'a, 230'b, 230'c, 230'd may have a width that is gradually decreasing as the distance from the air inlet 220 increases. In this configuration, the gap G4 between the plate barriers 230'a, 230'b, 230'c, 230'd is gradually enlarged in an outer direction. In this case, the flow rate of the cooling air passing through the gap G4 gradually increases in a lateral direction from the central portion based on the air inlet 220. The guide vane 230 may be an effective alternative to the above embodiment when the air inlet 220 has a sufficiently large size or the cell assembly 100 has a relatively small width.

Referring to FIG. 12, the guide vane 230 of this modified example may include two plate barriers 230" segmented into two parts at the rear of the air inlet 220 and symmetrical in a lateral direction. Here, a gap G5 through which the cooling air may pass may be formed between the two plate barriers 230", similarly to the above embodiment.

In this modified example, the overall air flow may be defined as three flows by means of the two plate barriers 230". That is, there may be an air flow passing through the gap G5 and air flows passing through the space between the two plate barriers 230" at both sides. For example, this modified example could be a good alternative of the second modified example described above, when the inlet duct 200 covers one unit cell assembly 100 of the above embodiment or when the air inlet 220 is sufficiently large or the number of the air channels 130 is relatively small.

Meanwhile, the battery module according to the present disclosure may be applied to configure an energy storage system (ESS) or a battery pack together with various devices for controlling charge and discharge such as a battery management system (BMS), a current sensor, and a fuse. The battery module may also be applied not only to vehicles such as electric vehicles and hybrid electric vehicles but also to other information technology (IT) products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

| Reference Signs | |
| --- | --- |
| 100: cell assembly | 110: battery cell |
| 120: cartridge | 130: air channel |
| 140: bus bar | 150: support frame |
| 160: insulation plate | 200: inlet duct |
| 210: duct housing | 220: air inlet |
| 230: guide vane | 231: main plate barrier |
| 232: sub plate barrier | 300: outlet duct |

What is claimed is:

1. A battery module, comprising:
   a cell assembly having battery cells arranged side by side in a lateral direction and air channels arranged in the lateral direction corresponding to intervals of the battery cells, each air channel extending straight in a length direction of the battery cells from a front surface of the cell assembly to a rear surface of the cell assembly such that the length direction is perpendicular to the lateral direction; and
   an inlet duct mounted to the front surface of the cell assembly at which the air channels are located to distribute a cooling air to the air channels,
   wherein the inlet duct includes:
      an air inlet disposed to face air channels, the air inlet being laterally located in a central region in the arrangement of the air channels and spaced apart from the front surface of the cell assembly;
      a cooling fan at the air inlet to introduce the cooling air; and
      a guide vane having a plurality of plate barriers respectively extending obliquely at a predetermined acute angle relative to the length direction toward the air channels relative to the air inlet to distribute the flow of air, the plurality of plate barriers being between the cooling fan and the front surface of the cell assembly with respect to the length direction,
   wherein the guide vane is segmented behind the air inlet to have four plate barriers that are obliquely arranged at the predetermined angle and symmetrical in the lateral direction and a vertical direction, and a gap is present among the four plate barriers so that the cooling air passes therethrough.

2. The battery module according to claim 1, wherein each of the four plate barriers includes:
   a main plate barrier located within a region to which the cooling air is perpendicularly introduced through the air inlet; and
   a sub plate barrier configured to extend outwards from the main plate barrier and having a smaller width in comparison to the main plate barrier, with the width being measured in a plane of the sub plate barrier in the vertical direction, the vertical direction being perpendicular to the predetermined angle.

3. The battery module according to claim 2, wherein the sub plate barrier includes a tail portion bent toward the front surface of the cell assembly at a terminal of the sub plate barrier.

4. The battery module according to claim 1, wherein the plate barriers have a width that gradually decreases from the air inlet so that the gap is gradually expanded.

5. The battery module according to claim 1, further comprising:
   an outlet duct having an air outlet and mounted to the rear surface of the cell assembly at which outlets of the air channels are located,
   wherein the air inlet, the inlets and outlets of the air channels, and the air outlet are disposed side by side in order so that the cooling air is guided to flow in the length direction.

6. The battery module according to claim 1, wherein the inlet duct includes a duct housing mounted to the front surface of the cell assembly, and wherein the duct housing has an inner cover surface forming an inclined surface from the air inlet to an edge of the cell assembly.

7. The battery module according to claim 1, wherein the cell assembly further includes a plurality of cartridges that form the air channels, support at least one of the battery cells and are configured to be assembled to each other.

8. The battery module according to claim 1, wherein electrode leads of the battery cells are electrically connected by a plurality of bus bars and are located at the front surface of the cell assembly.

9. The battery module according to claim 8, further comprising:
   a plurality of insulation plates made of an insulating material and located between two adjacent bus bars to prevent the bus bars from being electrically shorted.

10. An energy storage system, comprising the battery module defined in claim 1.

* * * * *